F. S. ADAMS.
PROCESS OF AND APPARATUS FOR PRECIPITATING COPPER FROM SOLUTIONS.
APPLICATION FILED JULY 20, 1920.
1,430,140.
Patented Sept. 26, 1922.
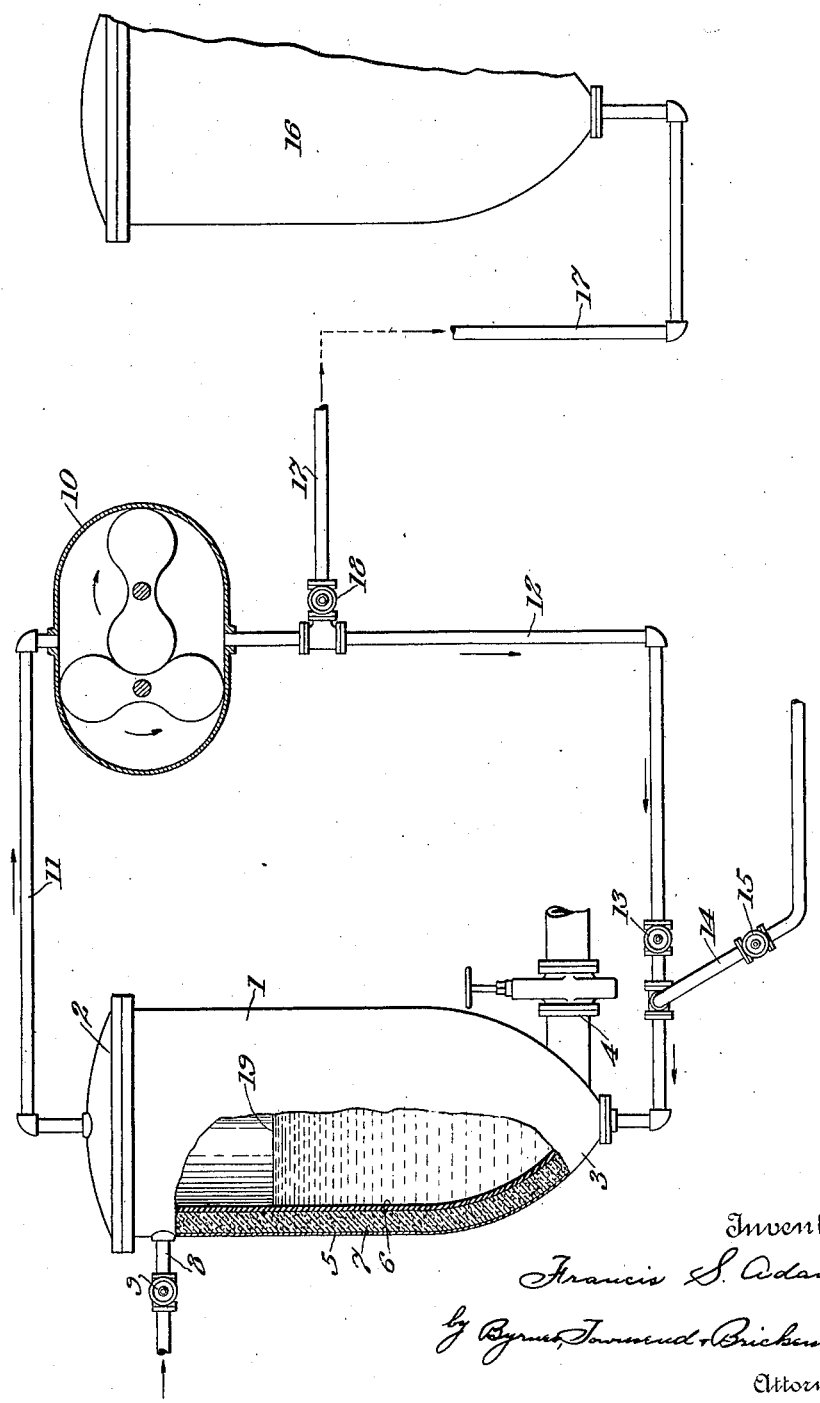

Patented Sept. 26, 1922.

1,430,140

UNITED STATES PATENT OFFICE.

FRANCIS S. ADAMS, OF ANACONDA, MONTANA.

PROCESS OF AND APPARATUS FOR PRECIPITATING COPPER FROM SOLUTIONS.

Application filed July 20, 1920. Serial No. 397,655.

*To all whom it may concern:*

Be it known that I, FRANCIS S. ADAMS, a citizen of the United States, residing at Anaconda, in the county of Deerlodge and State of Montana, have invented certain new and useful Improvements in Processes of and Apparatus for Precipitating Copper from Solutions, of which the following is a specification.

The present invention relates to the metallurgy of copper and more particularly to the precipitation of metallic copper from solutions such as the sulfate by means of sulfur dioxide with the aid of heat and pressure.

It is known that sulfur dioxide, under appropriate pressure and temperature conditions, is capable of precipitating from copper sulfate solutions a considerable proportion, say up to 60%, of the contained copper in the form of metal.

During the precipitation referred to, which is effected in closed vessels, gas and steam collect in the top of the vessel until a high pressure is attained. So far as its direct chemical effect on the liquid in the vessel is concerned, this mixture of gas and steam is practically through the performance of its useful work, and much of its precipitating value as well as its caloric content is therefore unused and lost.

I have discovered that by repeatedly passing sufficient sulfur dioxide gas through the hot copper sulfate solution, and more particularly by circulating through the body of liquid the gas and steam which collect in the vessel above the liquid during the introduction of the sulfur dioxide, the percentage of metallic copper precipitated is materially increased and the time required for the precipitating step is considerably reduced. In some instances the treatment described will produce such effective precipitation of the copper that it is unnecessary to further treat the spent solution with iron, as is customary, to recover the remaining copper content.

In the accompanying drawing I have shown diagrammatically an apparatus well suited to the carrying out of the process, the figure illustrating a side view with certain of the parts broken away.

The numeral 1 indicates a closed precipitating vessel capable of withstanding internal pressures, and provided in the instance shown with a dome 2. The bottom 3 of the vessel is preferably conical to facilitate removal of the precipitated copper and the metal-freed solution, e. g. through the valved outlet 4, and to facilitate the treatment of the liquid with the gas and steam. The vessel proper comprises a steel shell 5, an inner lining 6 of lead and an intermediate refractory filling 7, of brick or the like. A conduit 8 having a valve 9 may supply the copper sulfate solution to the vessel from the leaching tanks or other source of supply.

A suitable blower 10 is connected on its intake side with the upper part of the vessel 1 through a conduit 11 which in the particular instance shown makes connection at an elevated point in the dome 2. The blower may be of any type suitable for corrosive fluid circulation, but I have found the type known as the Root blower to be quite well adapted for the present purposes. It can be readily manufactured of non-corrosive materials and the shafts can be packed with lead packing.

The discharge side of the blower 10 is in controlled communication with the lower portion of the vessel 1 through a suitable conduit 12 provided with a valve 13. Between the valve 13 and the junction of the conduit 12 with the vessel 1, a conduit 14 having a valve 15 connects with the conduit 12 and thus with the lower part of the precipitating vessel 1. Steam and sulfur dioxide gas are introduced as required through the conduit 14.

The discharge side of the blower is also in controlled communication with a second precipitator indicated at 16. As illustrated, this communication is accomplished through a conduit 17 which joins the conduit 12 at a point between the blower and the valve 13. The conduit 17 is provided with a suitable valve 18.

In carrying out the process in the apparatus described, the copper-bearing solution is pumped into the vessel 1 through the inlet 8 until it attains the desired level, indicated at 19. Valve 9 is then closed, and with valve 13 also closed, valve 15 is opened to let in steam and sulfur dioxide gas under pressure until the solution attains a temperature corresponding to about 160 lbs. pressure,—approximately 188° C. The bulk of the copper, possibly as high as 60%, becomes precipitated at this time. Valve 15 is then closed and valve 13 opened and the blower 10 started. Steam and gas which have accumulated to a considerable extent in the upper part of the vessel 1 above the solution are thereby drawn off through the conduit 11 and driven back to and through the liquid in the vessel 1 by way of the conduit 12. During this time valve 18 is of course closed.

The subjection of the solution repeatedly to the sulfur dioxide gas by this circulation of the steam and gas is continued until the desired amount of copper has been precipitated, when valve 13 is closed and valve 18 opened. The steam and gas are now pumped into the next precipitator 16 to function in a similar manner, much sensible heat being in this manner conserved. During the conducting of the gas and steam to the second precipitator 16, the blower 10 acts as a vacuum pump and the considerable number of heat units released during the reduction of the pressure in vessel 1 from 160 lbs. to about 20 inches vacuum, and the corresponding lowering of the temperature from 188° C. to about 77° C. are transferred to the solution in the next precipitating vessel and thereby conserved. The solution may then be drawn off through the valved outlet 4 and the metallic copper separated therefrom in the usual manner.

It will be understood that the particular apparatus illustrated is but typical and that numerous changes may be made without departing from the scope of the invention, it being merely essential to the carrying out of the process that the system comprise a closed precipitating vessel, means for supplying the requisite materials, a blower or the like for returning the gas and steam to the solution, and preferably means for transferring the gas and steam from one precipitating vessel to another.

In the appended claims, the word "gases" is used to describe the gaseous mixture which collects above the solution, without regard to its relative gas or vapor content.

I claim:—

1. In the process of precipitating copper from hot solutions by sulfur dioxide, the step which consists in repeatedly passing sulfur dioxide gas through the solution.

2. In the process of precipitating copper from hot solutions, the steps which consist in passing sulfur dioxide through the solution, and circulating the gases from above the solution through the latter.

3. In the process of precipitating copper from hot solutions, the steps which consist in passing sulfur dioxide through the solution, withdrawing the gases from the precipitating vessel above the solution, and returning them under pressure to the vessel at a point beneath the level of the solution for circulation therethrough.

4. The process of precipitating copper from solutions which comprises passing sulfur dioxide and steam through the solution in a closed vessel until a substantial temperature and a substantial pressure are attained and the bulk of the copper content is precipitated, then discontinuing the supply of sulfur dioxide and steam, withdrawing the gases from the vessel above the solution and returning them under pressure to the vessel at a point beneath the level of the solution, the circulation being maintained until substantially all of the copper is precipitated.

5. In the process of precipitating copper from hot solutions, the steps which consist in passing sulfur dioxide through the solution, repeatedly withdrawing the gases from the precipitating vessel above the solution and returning them under pressure to the vessel at a point beneath the level of the solution for circulation therethrough, and finally transferring the gases to another precipitating vessel for repetition of the treatment on another batch of metal-bearing solution.

6. The process of precipitating copper from solutions which comprises passing sulfur dioxide and steam through the solution in a closed vessel until a substantial temperature and a substantial pressure are attained and the bulk of the copper content is precipitated, then discontinuing the supply of sulfur dioxide and steam, withdrawing the gases from the vessel above the solution and returning them under pressure to the vessel at a point beneath the level of the solution, the circulation being maintained until substantially all of the copper is precipitated, and finally transferring the gases to another precipitating vessel for repetition of the treatment on another batch of metal-bearing solution.

7. Apparatus for precipitating copper from hot solutions with sulfur dioxide, comprising a plurality of closed vessels adapted to receive separate portions of the metal-rich solution, means for supplying sulfur dioxide and steam to the solution, a blower for withdrawing the hot gases from the upper part of one of the vessels and circulating them through the solution in that vessel, and means for diverting the gases to another of the precipitating vessels.

In testimony whereof, I affix my signature.

FRANCIS S. ADAMS.